No. 833,961. PATENTED OCT. 23, 1906.
S. M. GUSS.
STUFFING BOX PACKING.
APPLICATION FILED MAR. 29, 1906.

Samuel M. Guss
Inventor

Witnesses

UNITED STATES PATENT OFFICE

SAMUEL M. GUSS, OF READING, PENNSYLVANIA.

STUFFING-BOX PACKING.

No. 833,961.    Specification of Letters Patent.    Patented Oct. 23, 1906.

Application filed March 29, 1906. Serial No. 308,694.

*To all whom it may concern:*

Be it known that I, SAMUEL M. GUSS, a citizen of the United States, and a resident of the city of Reading, county of Berks, and State of Pennsylvania, have invented certain new and useful Improvements in Stuffing-Box Packing, of which the following is a specification.

My invention relates to an improved stuffing-box packing intended for use in connection with steam-engines, hydraulic presses, or the like at any desired pressure and adapted to serve effectively with a minimum of wear and attention under conditions in which the axis of the reciprocating rod may not be accurately maintained in a fixed line.

My improved packing comprises a split packing-ring fitted laterally to an annular packing-ring chamber and provided with a circular groove in its rod-contacting inner surface arranged in communication with the chamber-space surrounding said ring and with the connected cylinder, whereby said ring is closed upon the reciprocating packed rod by the excess of pressure exerted upon the exterior of said ring by the steam or other operating medium admitted to the exterior portion of said chamber and to the communicating inner groove, the area of which latter is so proportioned as to partially counterbalance the exterior pressure as desired. It also comprises a spherical packing-ring circularly chambered interiorly to receive the packing ring or rings and means for further securing positive lubrication by combining a suitable lubricating medium with the steam admitted to the packing.

The invention is fully described in connection with the accompanying drawings, illustrating a preferred embodiment thereof, and the novel features are specifically pointed out in the claims.

Figure 1:
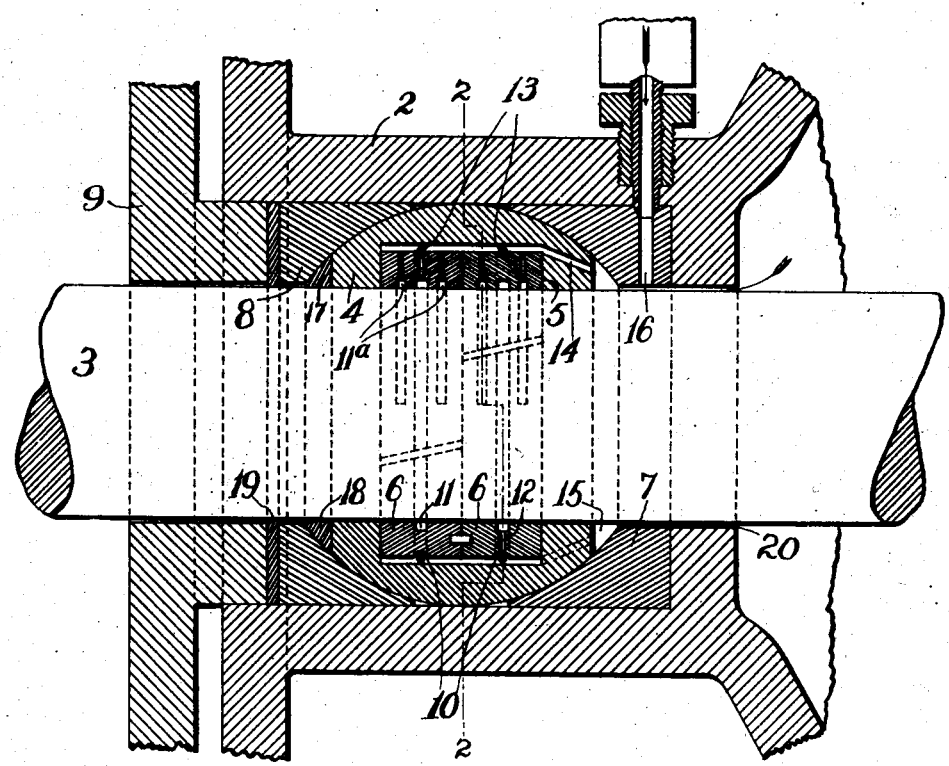
Figure 2:
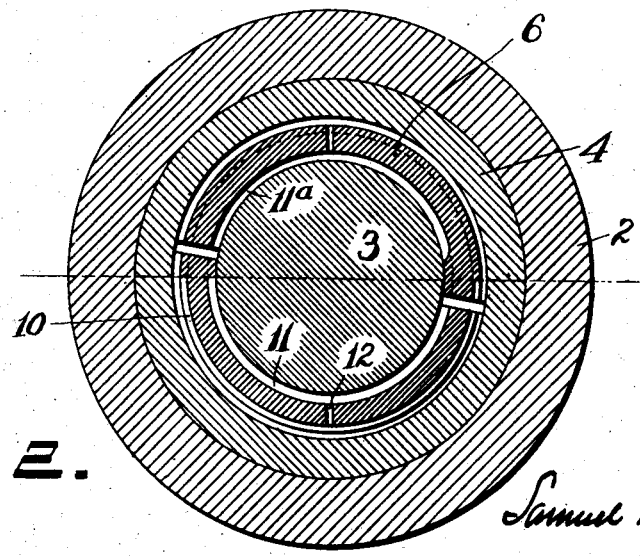

Figure 1 is a longitudinal sectional view showing my improved packing applied to a stuffing-box. Fig. 2 is a cross-sectional view taken on the line 2 2 of Fig. 1.

Fitted to the stuffing-box 2 and to the piston-rod or plunger 3 is a spherical packing-ring 4, having an interior circular groove or recess 5, adapted to form an annular chamber around the rod 3 for the reception of split packing-rings 6, nicely fitted therein so as to be tightly closed upon the plunger-rod, as required. This spherical ring 4 is located between follower-rings 7 and 8, also fitted exteriorly to the stuffing-box and bored to loosely encircle the rod 3, said follower-rings being spherically cupped on their opposing faces, so as to receive and bear upon the interposed spherical ring. The inner ring 7 is seated at the bottom of the stuffing-box, and the outer ring 8 is suitably pressed inward by a gland 9 to loosely clamp the spherical ring 4 between them.

The split packing-rings 6, as shown, are formed with exterior circumferential grooves 10 and also with similar interior grooves 11, connected with said grooves 10 by communicating openings 12, and spring-bands 13, located in the groove 10, as shown, serve to loosely clamp the half-rings together upon the rod 3. Opening into the packing-chamber 5 of the spherical ring and communicating with the split-ring grooves 10 and 11 is an inlet-passage 14, leading from an annular end chamber 15, formed between the spherical ring and the cupped follower-ring 7. From this annular chamber 15 the restricted flow of steam entering the stuffing-box from the cylinder through the rear opening 20 of the stuffing-box and the loosely-fitted ring 7 is thus admitted into the end chamber 15 and thence into the packing-chamber 5 and exerts its pressure upon the outer surface of the split packing-rings 6 to close the same tightly upon the rod 3, such closing pressure, however, being reduced as may be desired by the opposite or opening pressure exerted upon the parted ring in the inner circular groove 11 thereof. This groove 11 thus serves not only to provide a counterbalancing-pressure area whereby any undue closing pressure of the packing-ring upon the rod is avoided, but also provides a cushioning and lubricating steam-chamber around the rod, whereby friction and wear are greatly reduced, and the counterbalancing-pressure area thus provided may not only be proportioned to the exterior pressure area, as desired, but is preferably varied upon the upper and lower ring-sections forming supplemental inner grooves 11ᵃ upon the upper section, as indicated in the drawings, so as to secure a greater closing pressure upon the lower section tending to counterbalance the weight of the rod, and thereby maintain the latter in true axial position. In connection with this provision for utilizing steam-pressure upon the split packing-rings I also provide for effectively furnishing lubricating material to the parts, this being very simply and thoroughly accomplished by providing an oil-inlet 16 through the inner follower-ring 7, arranged in communication with any suitable oil-cup, as indicated, so that a required amount of lubricant may be automatically fed into the stuffing-box and positively combined and circulated with the steam into contact with the moving parts. In order to more fully utilize this lubricant and more thoroughly pack the box, I fill the outer annular chamber 17 with an absorbent packing material 18 and preferably interpose a suitable washer 19 between the gland 9 and the outer follower-ring 8, as shown. The spherical packing-ring 4, thus loosely fitted to the stuffing-box and held thereon between the follower-rings 7 and 8, is adapted to adjust itself freely in said box so as to always maintain its axis in accurate alinement with that of the reciprocating rod 3, while the split rings 6 at all times bear upon said rod, so as to insure a practically tight sliding fit with a minimum of pressure, such pressure being determined by the differential interior and exterior pressure areas of the rings, and thorough and economic lubrication of the parts being at the same time insured by combining the lubricant and positively circulating it with the steam or other operating medium, as described. The spherical ring 4, as well as the follower-rings 7 and 8, if desired, may be split longitudinally so as to facilitate their application to the rod 3; but in such case the meeting faces of the half-ring parts of said spherical ring are tightly fitted together, so that said completed ring is in all cases essentially a single-piece ring formed with a packing-chamber of fixed size, to which the split rings 6 are accurately fitted laterally. The preferred construction specifically described and shown may of course be variously modified without departing from the invention.

What I claim is—

1. A stuffing-box packing comprising a spherical packing-ring having an integrally-formed annular packing-chamber, and split packing-rings fitted to said chamber.

2. A stuffing-box packing comprising a spherical packing-ring having an integrally-formed annular packing-chamber, spherically-cupped follower-rings therefor, and split packing-rings fitted to said chamber.

3. A stuffing-box packing comprising a spherical packing-ring having an integrally-formed annular packing-chamber, with inlet-passage thereto, and split packing-rings fitted to said chamber and provided with circumferential grooves communicating with said inlet-passage.

4. A stuffing-box packing comprising a spherical packing-ring having an integrally-formed annular packing-chamber, spherically-cupped follower-rings forming annular end chambers between the same and the ends of said spherical ring, split packing-rings fitted to said packing-chamber and provided with circumferential grooves, an oil-inlet to one of said end chambers and passage therefor to the packing-chamber.

5. A stuffing-box packing comprising a spherical packing-ring having an integrally-formed annular packing-chamber, spherically-cupped follower-rings forming annular end chambers between the same and the ends of said spherical ring, split packing-rings fitted to said packing-chamber and provided with circumferential grooves, an oil-inlet to one of said end chambers and passage therefor to the packing-chamber, and an absorbent packing in the other end chamber.

6. A stuffing-box packing comprising a spherical packing-ring having an integrally-formed annular packing-chamber, spherically-cupped follower-rings therefor having the same exterior diameter as said spherical ring and split packing-rings fitted to said chamber.

7. In a stuffing-box packing arranged to form an annular packing-ring chamber, a square-faced split packing-ring fitted laterally to said chamber and provided with a circular groove in its rod-contacting inner surface having an opening therefrom communicating with the chamber-space surrounding said ring and with the connected cylinder, whereby said ring is closed upon the packed rod by the differential exterior pressure exerted thereon by the operating medium admitted to said groove.

8. In a stuffing-box packing arranged to form an annular packing-ring chamber, a square-faced split packing-ring fitted laterally to said chamber and provided with a circular groove in its rod-contacting inner surface having an opening therefrom communicating with the chamber-space surrounding said ring and with the connected cylinder, the groove area of the rod-supporting section of said split ring being less than that of the opposing ring-section, whereby said ring-sections are closed upon the packed rod by different differential exterior pressures exerted thereon by the operating medium admitted to said groove.

In testimony whereof I affix my signature in the presence of two witnesses.

SAML. M. GUSS.

Witnesses:
D. M. STEWART,
W. G. STEWART.